United States Patent [19]

Sauer et al.

[11] Patent Number: 5,106,283
[45] Date of Patent: Apr. 21, 1992

[54] APPARATUS FOR INJECTION MOLDING PLASTIC MATERIAL

[75] Inventors: Roland Sauer; Johann Holzschuh; Helmut Echkardt; Michael Renger, all of Meinerzhagen, Fed. Rep. of Germany

[73] Assignee: Battenfeld GmbH, Meinerzhagen, Fed. Rep. of Germany

[21] Appl. No.: 571,769

[22] Filed: Aug. 22, 1990

[30] Foreign Application Priority Data

Aug. 22, 1989 [DE] Fed. Rep. of Germany ....... 3927671
Nov. 1, 1989 [DE] Fed. Rep. of Germany ....... 3936290

[51] Int. Cl.$^5$ ............................................. B29C 45/23
[52] U.S. Cl. ............................. 425/130; 264/328.8; 264/572; 425/562; 425/564
[58] Field of Search .............. 425/130, 562, 563, 564, 425/565, 566; 264/572, 328.13, 328.8

[56] References Cited

U.S. PATENT DOCUMENTS

| | | | |
|---|---|---|---|
| 2,940,123 | 6/1960 | Beck et al. | 425/170 |
| 3,947,175 | 3/1976 | Melcher | 425/130 |
| 3,947,177 | 3/1976 | Eckardt | 425/130 |
| 3,966,372 | 6/1976 | Yasuike et al. | 425/564 |
| 4,078,875 | 3/1978 | Eckardt | 425/564 |
| 4,272,236 | 6/1981 | Rees et al. | 425/564 |
| 4,376,625 | 3/1983 | Eckardt | 425/564 |
| 4,744,746 | 5/1988 | Granger | 425/564 |
| 4,781,554 | 11/1988 | Hendry | 425/564 |
| 4,834,294 | 5/1989 | Herzog | 425/564 |

FOREIGN PATENT DOCUMENTS

| | | | |
|---|---|---|---|
| 2716817 | 8/1978 | Fed. Rep. of Germany | 425/563 |
| 51-25555 | 3/1976 | Japan | 425/562 |

Primary Examiner—Tim Heitbrink
Attorney, Agent, or Firm—Toren, McGeady & Associates

[57] ABSTRACT

An apparatus for injection molding of plastics material in accordance with a gas or liquid injection method. The apparatus includes a nozzle which can be applied to the injection molding die or the injection mold. This nozzle enables selectively the sole injection of plastics material melt, the simultaneous injection of plastics material melt and medium as well as the sole injection of medium into the mold cavity of the injection molding die or injection mold. The melt is supplied to the nozzle mouth by the extruder screw cylinder of the extruder around a nozzle torpedo, while the medium is introduced into the nozzle so as to be spaced from the nozzle mouth. The automatic operation of the apparatus in the course of all three types of operation is made possible by locating a check valve in the melt supply line of the nozzle between the upstream end of the nozzle torpedo and the junction piece of the extruder screw cylinder, which check valve can be automatically brought into its closed position in direction counter to the extruder screw cylinder.

20 Claims, 3 Drawing Sheets

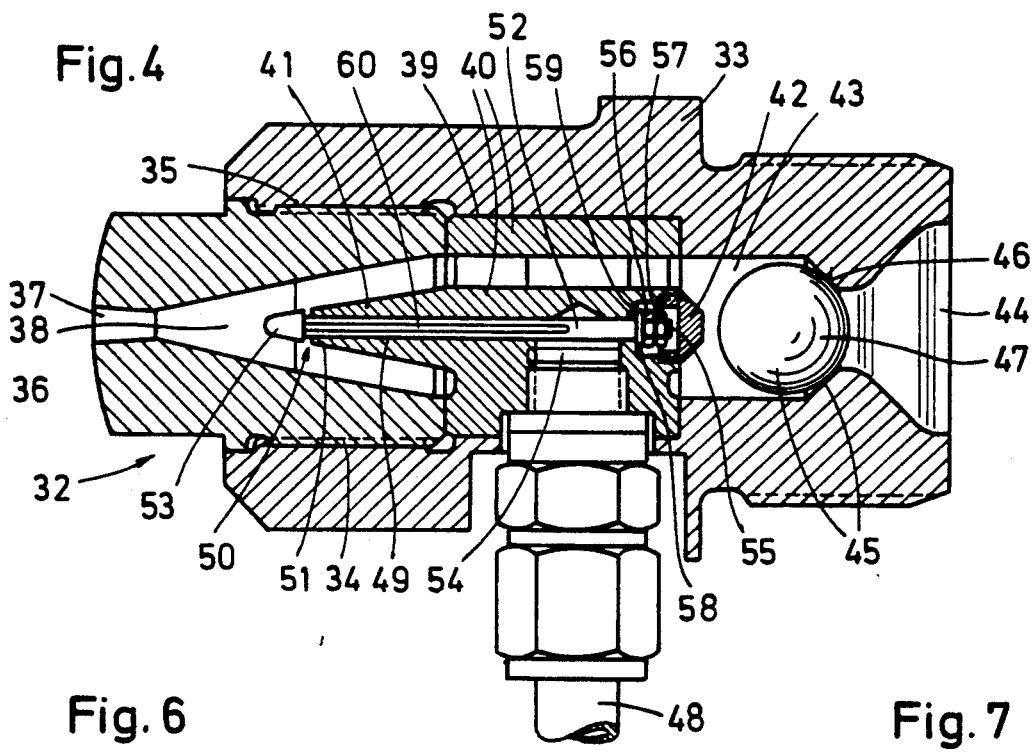
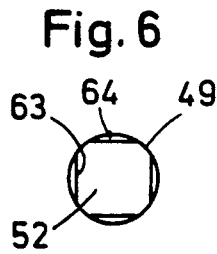
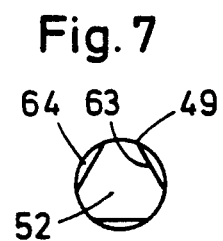
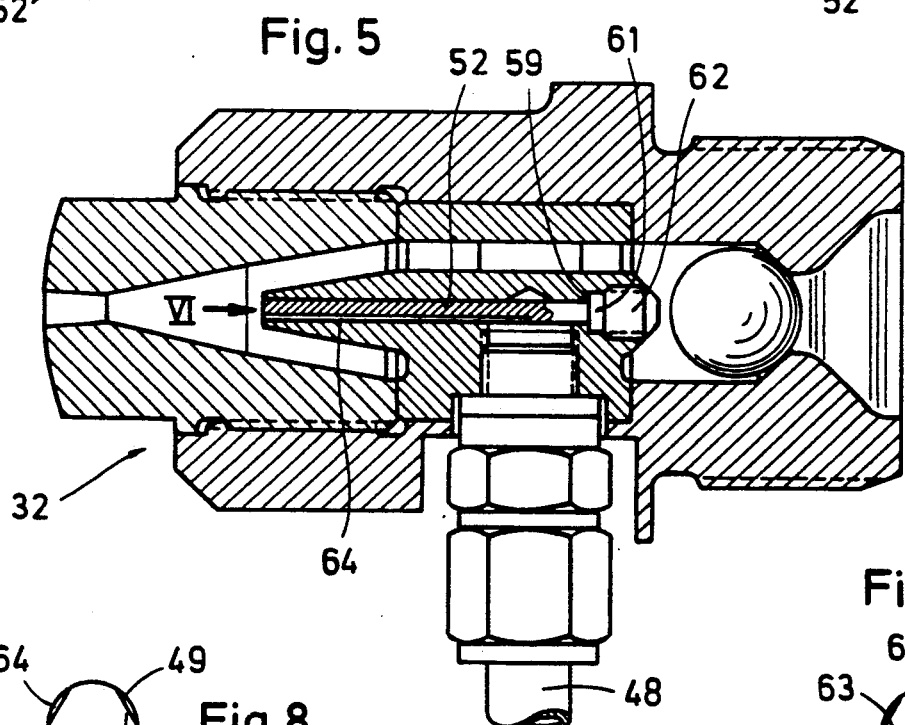
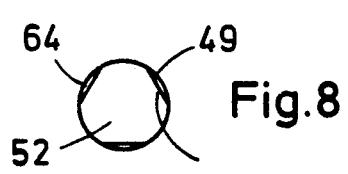
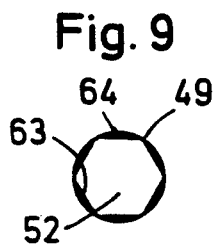

APPARATUS FOR INJECTION MOLDING PLASTIC MATERIAL

BACKGROUND OF THE INVENTION

1. Field of the Invention

The invention is directed to an apparatus for injection molding of plastics material according to the injection process which operates with a nozzle attachable to an injection tool or an injection mold, wherein the nozzle enables selectively the sole injection of plastics melt, the simultaneous injection of a plastic melt and of a gaseous or liquid medium as well as the sole injection of a medium into the mold cavity, and wherein the melt is suppliable from the extruder cylinder of the extruder around a nozzle torpedo or spreader to the nozzle mouth and the medium is introducible into the nozzle so as to be spaced from the nozzle mouth.

2. Description of the Prior Art

In known devices of this type it is disadvantageous that the melt flow of the plastics material to the nozzle must be interrupted by external control of an associated cutoff, if it is important that exclusively for instance gas is injected through this nozzle into the mold cavity of the injection molding die or the injection mold, which mold was previously possibly supplied only with plastics material or with a mixture of plastics material and gas.

The external control of a cutoff for the melt flow provided results in this known device is a relatively high construction cost, because apart from the cutoff itself hydraulic cylinders with control devices must be additionally provided at the injection molding machine. Difficulties result in the known embodiments however also if it is necessary to equip the device with an extended or elongated nozzle.

SUMMARY OF THE INVENTION

It is the object of the invention to indicate an apparatus for injection molding of plastics material according to the injection method which can not only be built at a low construction cost, but which can also be operated without any sort of external control and, thus, completely automatically.

In accordance with the present invention, the above object is met essentially by placing a check valve in the melt supply of the nozzle or die between the upstream end of the nozzle torpedo and the junction piece for the screw extruder cylinder, which check valve can be brought to its closed position in direction counter to the screw extruder cylinder.

It was seen that such a valve controlled only by mass pressure satisfies all operational conditions which can arise without any problems, by reliably preventing the medium from reaching the melt space located behind or downstream of the die proper or the screw extruder cylinder, especially if only the medium alone is to be injected through the die into the mold cavity of the injection molding tool or the injection mold.

It has especially proved itself in the invention to configure the check valve as a ball check valve whose ball cutoff member is enclosed in the space bounded on the one side by the upstream end of the nozzle torpedo and at the other side by the preferably conical valve seat, which space has a larger diameter than that of the ball cutoff member.

If plastics material is injected alone or together with a medium through the nozzle into the mold cavity of the injection die or the injection mold, the ball check valve opens automatically. The plastics melt flows around the ball cutoff member in a direction towards the nozzle torpedo, wherein the nozzle torpedo, the ball cutoff member and the plastics melt together counteract a return flow of the medium into the melt space located downstream of the nozzle or into the screw extrusion cylinder, in order to avoid sealing problems involving the pressure of the medium.

The check valve functions in an optimum manner if the length of the space in which the ball cutoff member of the ball check valve can move, is laid out to be at least as large that it corresponds to its diameter. In case of short opening and closing actuation travels of the ball cutoff member, there results in this way an optimum flowthrough cross-section for the plastics melt.

A particularly advantageous layout of the apparatus is achieved in the invention if the check valve is arranged coaxially with the melt supply, the nozzle torpedo and the nozzle orifice, because in that case the gaseous or liquid medium can be introduced through a line from the side into the nozzle torpedo and can be conducted out of it through a central channel in axial alignment with the nozzle orifice or mouth.

It is important in the invention, for reasons of simple assembly as well as easier maintainability, that the nozzle orifice and the nozzle torpedo are detachably insertable into a nozzle socket, wherein the nozzle socket contains the space for receiving the ball check valve. The nozzle torpedo can comprise a slender cone facing the nozzle orifice and an obtuse cone facing the ball check valve.

The layout of the device in the invention is intended in the first place to enable an operation controlled exclusively by mass pressure, thus an automatic operation. It lies however also within the framework of the invention to place the check valve downstream of a nozzle cutoff assigned to the melt supply, thus to integrate a nozzle controlled by mass pressure into already existing automatic cutoff nozzles, in order to eliminate their problems involving sealing.

It was seen to be advantageous to provide in the invention a check valve, preferably a ball check valve, in the transitional region between the side supply line for the gaseous or liquid medium and the channel lying in axial alignment with the nozzle orifice and to design the check valve for automatic closure in case of interruption of the media supply. It has, however, also proved itself according to another embodiment feature of the invention in connection with an apparatus for injection molding of plastics material according to the injection method, to arrange a needle-like core replaceably or removably and/or adjustably in the central channel of the nozzle torpedo so as to be able to influence, especially vary, the flowthrough cross-section of the orifice aperture of the central channel towards the nozzle cone by means of the needle-like core.

In the simplest case, the needle-shaped core can be provided in the invention so as to be axially adjustable to a limited extent in the central channel of the nozzle torpedo, wherein it forms according to another refinement of the invention at least a slit valve together with the outlet aperture of the central channel. It was found to be especially advantageous and effective if, according to the invention, the nozzle gap of each slit valve has a maximum slot width of 0.02, preferably less than 0.1 mm, because an introduction of liquid plastics melt into the slit valve or the slit valves and into the central channel of the nozzle torpedo can hereby be countered in the simplest manner in case of cessation of medium pressure. Undesirable blockages of each slit valve or the central channel containing same can thus be effectively eliminated.

In the simplest case, the needle-like core can in the invention form a radially-directed slit valve together with the outlet or mouth end of the central channel, for instance by the needle-like core having a thickened head or dish upstream of the outlet end of the central channel, wherein the largest external diameter of the head or disk corresponds at least approximately to the external diameter of the nozzle torpedo at the outlet end of the central channel. In that case an annular gap valve is formed between the head of a dish of the needle-like core and the mouth or outlet end of the central channel. It lies also within province of the invention to provide the free end of the head or the dish with a tip or a roundingoff.

The media supply to the slit valve, especially to the annular slot valve, can in the invention be assured by providing a needle-like core with at least one longitudinal groove or diametrical slot along the longitudinal segment following adjacently upon its free end, for instance the head or the dish, and leading back into the region of a widening toward the side channel in the nozzle torpedo.

On the other hand it lies also within the context of the invention that the needle-like core is provided with at least one, preferably however, circumferential flattenings across a longitudinal segment following adjacently upon its free end and leading backwards into the region of a widening to the side channel in the nozzle torpedo.

Finally, it is also proposed in the invention that the needle-like core be retained in the nozzle torpedo to be adjustable or fixable by means of threaded links.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

BRIEF DESCRIPTION OF THE DRAWINGS

FIG. 4 shows a longitudinal sectional diagram at an enlarged scale through a modified construction of a die corresponding to FIG. 1, FIG. 5 shows a further modification of a die in FIG. 4, and FIGS. 6 to 9 show different variants of a front view in the direction of the arrow IV in FIG. 5.

DESCRIPTION OF THE PREFERRED EMBODIMENTS

Figure 1:
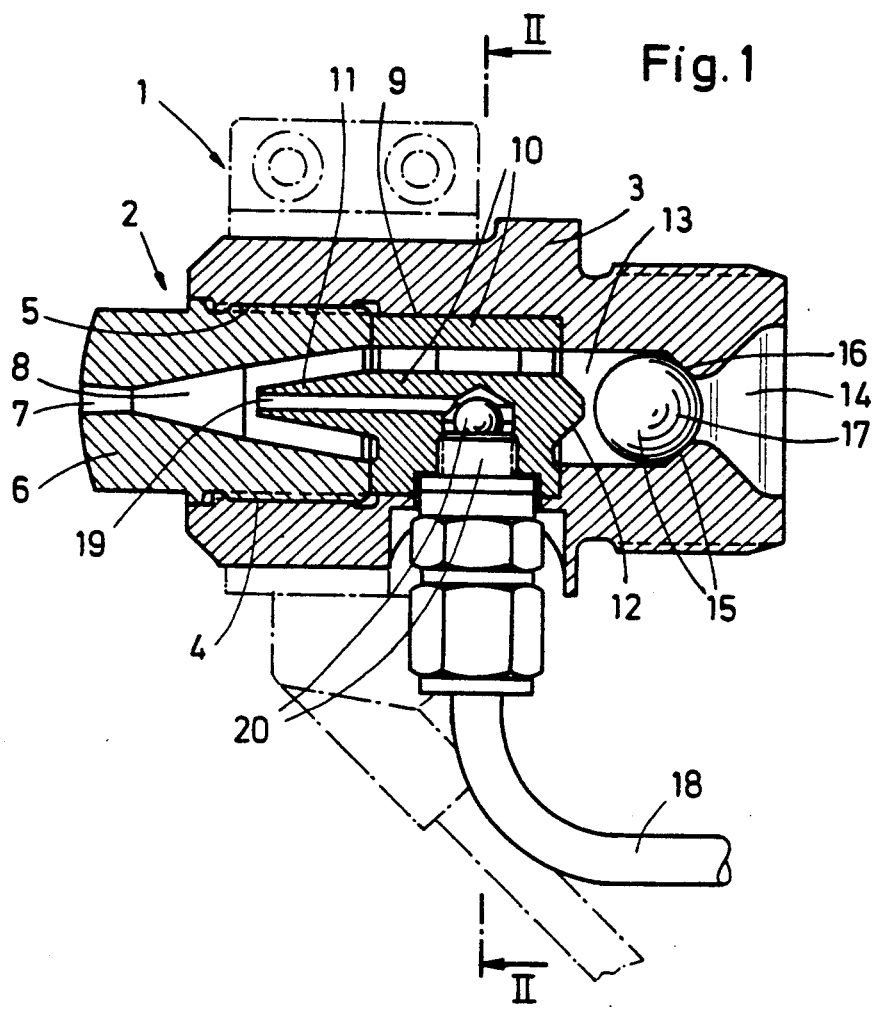
FIG. 1 shows a die equipped with a check valve of an apparatus for injection molding of plastics material by the injection process in longitudinal section and at approximately natural size.

The apparatus 1 for injection molding of plastics material by the gas or liquid injection method is equipped with a die or nozzle 2 which comprises a nozzle socket 3.

The nozzle orifice 6 is threaded by means of an external thread 5 into an internal thread 4 of this nozzle or die socket; the free end of this nozzle orifice can be applied to an injection die or an injection mold, not shown.

The nozzle orifice 6 has a coaxial nozzle outlet 7 and a nozzle cone 8 adjacent thereto. The nozzle cone 8 widens towards the end of the nozzle orifice 6 facing away from the nozzle outlet 7. A nozzle torpedo 10 is housed in a recess 9 between the nozzle orifice 6 and the nozzle socket 3, which torpedo comprises a slender cone 11 protruding into the nozzle cone 8 as well as facing the nozzle outlet 7 as well as an obtuse cone 12 facing away therefrom. While the slender cone 11 is oriented coaxially to the nozzle outlet 7 and the nozzle cone 8, the obtuse cone 12 projects also coaxially into a space 13 in the nozzle socket 3 which follows upon the recess 9 and has a connection to the melt supply 14.

The check valve 15 is housed in the space 13 of the nozzle socket 3, which valve is preferably designed as a ball check valve. This check valve 15 is formed by a stationary valve seat 16 in the nozzle socket 3, preferably a conical valve seat, as well as by a ball shutoff member.

The closed position of the check valve 15 is achievable in direction against the melt cylinder, by the ball cutoff member 17 abutting against the conical valve seat 16 as can be seen in FIG. 1. On the other hand, the check valve 15 opens in direction towards the nozzle torpedo 10, by moving its ball cutoff member 17 through the melt flow up to and against the free end of the obtuse cone 12. The space 13 in which the ball cutoff member 17 is enclosed has a diameter which exceeds that of the ball cutoff member 17 by a predetermined dimension. Consequently, an annularly-shaped throughflow slot is exposed between the ball cutoff member 17 and the circumferential walls of the space 13 when the check valve 15 is open.

It was seen to be expedient for obtaining an optimum throughflow slot if the length of the space 13 between the valve seat 16 and the free end of the obtuse cone 12 has a length dimension which corresponds at least to the diameter of space 13. With a small opening and closing travel of the check valve 15 an optimum throughflow slot for the plastics melt is obtained herein in the region of the check valve, so that the melt can flow along or through the nozzle torpedo 10 into the nozzle cone 8 of the nozzle orifice 6.

The medium, for instance nitrogen, required for the injection method is introduced through a line 18 from the side in the nozzle torpedo 10 and arrives there into a channel 19 which is in axial alignment with the nozzle outlet 7 and the nozzle cone 8 and which discharges into the nozzle cone 8 through the free end of the slender cone 11 at the nozzle torpedo 10. The outlet end of the channel 19 has a considerable spacing from the nozzle outlet 7, so that the medium exiting here penetrates into the center of the plastic melt flow prior to being injected through the nozzle cone 8 and the nozzle outlet 7 into the mold cavity of the injection die or injection mold.

The gas or liquid supply into the nozzle torpedo 10 can naturally also be interrupted, so that a pure plastics material melt flow is injected into the mold cavity of the injection die or the injection mold.

On the other hand, the possibility also exists to merely inject for instance gas through the nozzle orifice 6 into the mold cavity of the injection die o the injection mold, by simply interrupting the supply of the plastics melt from the screw extrusion cylinder of the extruder through the melt supply 14. In this case, the ball cutoff member 17 of the check valve 15 is pressed against the valve seat 16 by the mass pressure of the escaping gas and thus the flowback of gas into the melt supply 14 is automatically countered.

It is advantageous to provide a check valve 20 preferably a ball check valve, inside of the nozzle torpedo 10 in the transition region of the line 18 to the channel 19. This valve is preferably designed in such a way that it blocks completely automatically the passage through the line 18 if the gas supply is interrupted, so that no plastics melt can penetrate into this line 18 and sealing problems against the gas pressure are prevented.

Figure 2:
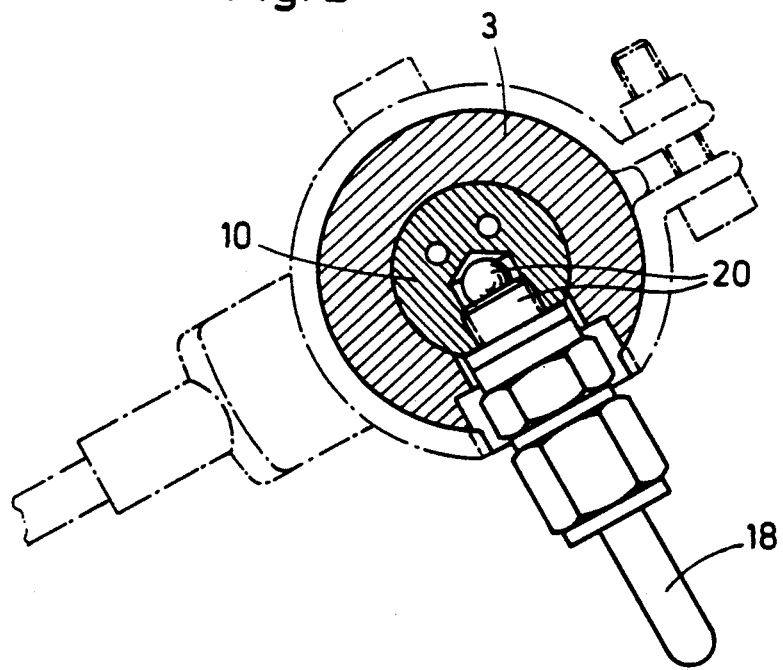
FIG. 2 shows a section along the line II-II through the die in FIG. 1.
Figure 3:
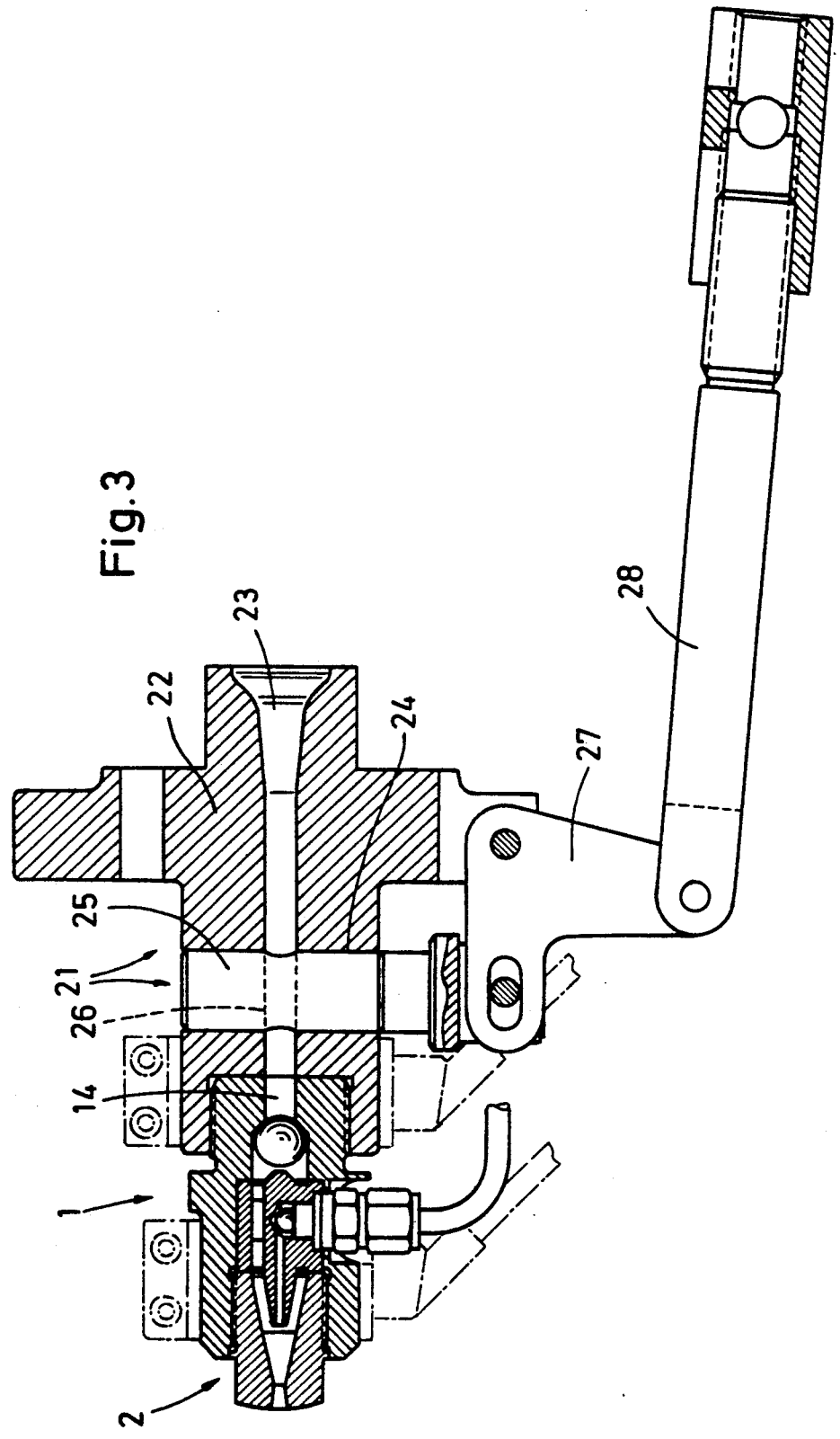
FIG. 3 shows the die as shown in FIGS. 1 and 2 assigned to a transverse bolt cutoff for the melt supply located at the outlet side of the screw extrusion cylinder of an extruder.

Although the nozzle 2 equipped with the check valve 15 as part of the apparatus for injection molding of plastics material in accordance with the gas injection process as constructed in the versions of FIG. 1 and FIG. 2 is completely functional if used alone, it was shown to be particularly advantageous to utilize this nozzle 2 in operational connection with a nozzle cutoff, for instance a so-called bolt cutoff 21 as this is shown in FIG. 3 of the drawing.

The transverse bolt cutoff is seated at the outlet end of the extruder screw cylinder of an extruder and comprises a junction stub 22 with a coaxial melt supply 23. A bore 24 is located in the junction stub 22 diametrically to this melt supply, with a transverse bolt 25 being guided in said bore with a snug fit so as to be axially displaceable. This transverse bolt 25 has a radial throughbore 26. The throughbore 26 can be selectively aligned with the melt supply 23 through axial displacement of the transverse bolt 25 or it can be displaced with respect to this supply transversely to the longitudinal axis. In the first mentioned the melt supply 23 is open towards the nozzle 2 with its check valve 15. In the second case, it is blocked. The movement of the transverse bolt 25 is accomplished by a bell crank 27 which is supported in the junction stub 22 with an actuation linkage 28 engaging on the other side at the bell crank.

The existence of the check valve 15 within the nozzle 2 of the device 1 acts against the sealing problems, which generally are encountered with a constructionally simple transverse bolt cutoffs 21.

It is easily discernible from FIG. 3 that the nozzle 2 integrated into the device 1 is completely identical with the nozzle 2 in FIG. 1 as far as construction and function are concerned.

The nozzle 32 in FIG. 4 of the drawing is essentially designed identically as the nozzle 2 in FIGS. 1 to 3. Therefore the same structure and functional parts have been provided with reference numbers there whose last digit coincides with the respective digit in FIGS. 1 to 3, where however the first digit has been respectively increased by the factor 3. Consequently the nozzle in FIG. 4 carries the reference number 32 instead of the reference number 2, etc.

The essential difference between the nozzle 32 in FIG. 4 and the nozzle 2 in FIGS. 1 to 3 is seen in that, in the nozzle 32, one no check valve 20 is assigned at the rearward end of the central channel 49 in the nozzle torpedo 40, rather instead a slit valve 50 whose functional elements extend across the entire length of the central channel 49 up to its discharge end into the nozzle cone 38.

In FIG. 4 a needle-like core 52 is located in the central channel 49 of the nozzle torpedo 40 so as to be replaceable or removable and/or displaceable, wherein this core fills the central channel 49 in cross-section with sliding fit. The needle-like core 52 carries at its front end a thickened head or disk 53, for instance a cone member provided with an end rounding, and towards the rear to the side channel 48 through a widening 54. The rear end of the needle-like core 52 is provided with a threaded extension 55 with which an adjustment nut 56 and a lock nut 57 cooperate. An axial adjustment of the needle-like core 52 in the center channel 49 can be carried out by means of the adjustment nut 56 and the lock nut 57 as well as the support disk 58 resting at a shoulder 59 of the nozzle torpedo, in order to influence the magnitude of the slit valve 50 designed as a radial annular slit valve upstream of the discharge end 51 of the central channel 49; this can be done in an extremely sensitive manner. It has proven itself, to arrange the slit width of the slit valve 50 to be smaller than 0.2 mm preferably however smaller than 0.1 mm.

Since the needle-like core 52 penetrates the central channel 49 of the nozzle torpedo practically without play, a diametrical slot or longitudinal groove 60 follows adjacently upon its head or disk 53, wherein the slot or groove extends back into the region of the widening 54 towards the side channel 48, exposes a relatively narrow passage from the widening 54 to the slit valve 50 for the gaseous or liquid medium, for instance nitrogen.

The gap or slit width of the radial slit valve 50 upstream of the discharge end 51 of the central channel 49 can in every case be adjusted in such a way by the adjustment nut 56 and the lock nut 57 relative to the nozzle torpedo 40, so that an undesirable penetration of plastics melt is not encountered if a medium supply through the slit valve 50 had not occurred or had been interrupted. The slit valve 50 is kept open by a non-depicted compression spring arranged between the lock nut 57 and the obtuse cone 42. The nozzle 32 in FIG. 5 of the drawing is again extensively identical with the nozzle 32 in FIG. 4 of the drawing as far as its construction is concerned. A change has been made only concerning the needle-like core 52 arranged in the central channel 49 of the nozzle torpedo 40, wherein the needle-like core 52 is abutted by means of an end thickening 61 against the shoulder 59 and is fixed by a threaded plug 62 which assumes the same task at the location concerned as the obtuse cone 12 in the nozzle 2 in FIGS. 1 to 3.

The end of the needle-like core 52 facing away from the end thickening 61 does not have a head or dish 53 lying upstream of the discharge end 51 of the central channel 49 in the embodiment in FIG. 5, rather this end is terminated approximately flush with the discharge end 51.

Since the needle-like core 52 is placed practically without play in the central channel 49 also in the nozzle 32 in FIG. 5, the slit valve 50 is created at the discharge end 51 of the central channel 49 by giving the needle-like core 52 a circumferential flattening 63 which extends up into the region of the widening 54 towards the side channel 48 and thus maintains a circular segment-shaped gap or slit spacing 64 over the entire length of the central channel 49. The passage cross-section of the slit spacing 64 simultaneously also defines the passage cross-section of the slit valve 50.

Since the needle-like core 52 is retained in the nozzle torpedo so as to be easily replaceable, the magnitude of the slit valve 50 can be easily adapted to varying requirements, mainly by using correspondingly different needle-like cores 52.

A comparison of the FIGS. 6 to 9 of the drawing demonstrates clearly the variety of the needle-like core 72 which can be used.

FIG. 6 of the drawing shows for instance a needle-like core 52 comprising four uniformly distributed circumferential flattenings 63. Thus it bounds together with the central channel 49 four equal slit spacings 64, whereby necessarily four slit valves 50 of corresponding size result at the discharge end of the central channel 49.

FIGS. 7 and 8 show respectively needle-shaped cores 52 with three circumferential flattenings 63, so that these together with the central channel create respectively three segment-shaped gap spacings 64 and consequently also three slit valves 50.

Since finally the needle-like core 52 in FIG. 9 is equipped with eight circumferential flattenings 63 in this case eight gap spacings 64 are created together with the central channel 49 and thus also eight slit valves 50.

In every case in the nozzles 32 in FIGS. 4 and 5 the slit valves 50 assigned to the central channel 49 for the medium supply are dimensioned only to-be as large as needed so that they permit in every case passage of the gaseous or liquid medium, for instance nitrogen, which is subjected to pressure, but prevent penetration of plastics melt and with it an undesirable blockage of the central channel 49.

We claim:

1. In an apparatus for injection molding plastics material, the apparatus including an injection molding die or injection mold, a nozzle attached to the injection molding die or injection mold, the nozzle including means for selectively solely injecting a plastics material melt, simultaneously injecting said plastics material melt and a fluid medium, and solely injecting said fluid medium into a mold cavity of the injection molding die or injection mold, the nozzle including a nozzle passage with a nozzle orifice facing the mold cavity for conducting the melt to the nozzle orifice from an extruder screw cylinder in communication with a melt supply portion of the nozzle passage, the nozzle passage having a cone-shaped portion adjacent the nozzle orifice, the cone-shaped portion having a diameter which increases with increasing distance from the nozzle orifice, a check valve being mounted in the nozzle passage, the improvement comprising a nozzle torpedo mounted in the nozzle passage, the nozzle torpedo having a conical portion having a free end facing the nozzle orifice and projecting into the cone-shaped portion of the nozzle passage, the free end of the conical portion being spaced form the nozzle orifice, the nozzle torpedo including a channel for conducting the fluid medium to the free end of the conical portion of the nozzle torpedo and into the cone-shaped portion of the nozzle passage, and the nozzle passage defining a space between the melt supply portion and an upstream end of the nozzle torpedo, the check valve being mounted in said space.

2. The apparatus according to claim 1, wherein the check valve is a ball check valve having a ball cutoff member, the space having a greater diameter than the ball cutoff member.

3. The apparatus according to claim 1, wherein the space has a length which is at least equal to the diameter of said space.

4. The apparatus according to claim 1, wherein the check valve is mounted coaxially with the nozzle passage, with the nozzle torpedo and with the nozzle orifice.

5. The apparatus according to claim 1, comprising a fluid line extending through a side wall of the nozzle into the channel of the nozzle torpedo, wherein the channel is axially aligned with the nozzle orifice.

6. The apparatus according to claim 1, wherein the nozzle comprises a nozzle socket for detachably receiving the nozzle orifice and the nozzle torpedo, the nozzle socket defining the space for the check valve.

7. The apparatus according to claim 1, wherein the upstream end of the torpedo has an obtuse cone.

8. The apparatus according to claim 1, comprising a nozzle cutoff means upstream of the check valve.

9. The apparatus according to claim 5, comprising a ball check valve in the fluid to the channel in the nozzle torpedo, the ball check valve in the line being configured to automatically close when medium supply is interrupted.

10. The apparatus according to claim 1, comprising a needle-shaped core adjustably mounted in the channel of the nozzle torpedo, whereby a passage cross-section of the channel at the free end thereof is adjustable.

11. The apparatus according to claim 10, wherein the needle-shaped core is mounted in the channel of the nozzle torpedo so as to be movable to a limited extent.

12. The apparatus according to claim 10, wherein the needle-shaped core defines together with a discharge aperture of the channel in the nozzle torpedo at least one slit valve.

13. The apparatus according to claim 12, wherein the at least one slit valve has a nozzle gap with a maximum gap width of 0.02 mm.

14. The apparatus according to claim 12, wherein the at least one slit valve has a nozzle gap with a gap width of 0.1 mm.

15. The apparatus according to claim 10, wherein the needle-shaped core forms together with a discharge end of the channel in the nozzle torpedo a radially oriented slit valve.

16. The apparatus according to claim 10, wherein the needle-shaped core comprises a head in front of the free end of the conical portion of the nozzle torpedo, and wherein the head has an external diameter which corresponds at least approximately to an external diameter of the free end of the conical portion of the nozzle torpedo, and wherein an annular slit valve is formed between the head and the free end of the conical portion of the nozzle torpedo.

17. The apparatus according to claim 16, wherein the head comprises a tip.

18. The apparatus according to claim 16, wherein the needle-shaped core has at least one longitudinal groove or diametrical slot extending from the head to a widening of the channel in the nozzle torpedo in communication with a fluid line for introducing the fluid medium into the channel.

19. The apparatus according to claim 16, wherein the needle-shaped core comprises at least one circumferential flattening extending from the head to a widening in the channel of the conical portion of the nozzle torpedo in communication with a fluid line for supplying the fluid medium, whereby slit valves are formed at the discharge end of the channel.

20. The apparatus according to claim 10, wherein the needle-shaped core is mounted in the nozzle torpedo by threaded members.

* * * * *